United States Patent
Choe et al.

(10) Patent No.: US 8,913,216 B2
(45) Date of Patent: Dec. 16, 2014

(54) STRIPED DIFFUSER, METHOD OF MANUFACTURING THE SAME, AND LIQUID CRYSTAL DISPLAY DEVICE WITH ADJUSTABLE VIEWING ANGLE EMPLOYING THE STRIPED DIFFUSER

(75) Inventors: Kyumin Choe, Suwon-si (KR); Seongmo Hwang, Seongnam-si (KR); Moongyu Lee, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 1063 days.

(21) Appl. No.: 12/370,174

(22) Filed: Feb. 12, 2009

(65) Prior Publication Data
US 2009/0310064 A1    Dec. 17, 2009

(30) Foreign Application Priority Data
Jun. 16, 2008 (KR) ........................ 10-2008-0056529

(51) Int. Cl.
| | | |
|---|---|---|
| *G02F 1/1335* | (2006.01) | |
| *G02B 5/02* | (2006.01) | |
| *G02B 5/30* | (2006.01) | |
| *H01P 5/00* | (2006.01) | |

(52) U.S. Cl.
CPC .. *G02B 5/0278* (2013.01); *G02F 2001/133562* (2013.01); *G02F 2001/133567* (2013.01); *G02B 5/0268* (2013.01); *G02B 5/0242* (2013.01); *G02B 5/0263* (2013.01); *G02B 2207/123* (2013.01); *G02F 1/133504* (2013.01)
USPC ............ 349/96; 349/106; 349/117; 349/119; 359/599; 359/489.07; 359/485.03; 359/485.05; 362/558

(58) Field of Classification Search
USPC .................... 349/113, 96, 117, 119; 359/599, 359/489.07, 485.03, 385.05; 362/558
See application file for complete search history.

(56) References Cited

U.S. PATENT DOCUMENTS

| | | | | |
|---|---|---|---|---|
| 6,297,908 B1 * | 10/2001 | Suga | ............................. | 359/599 |
| 6,880,946 B2 * | 4/2005 | Mullen | ........................ | 362/627 |

(Continued)

FOREIGN PATENT DOCUMENTS

| | | |
|---|---|---|
| JP | 09-197405 A | 7/1997 |
| JP | 2000-56105 A | 2/2000 |

(Continued)

OTHER PUBLICATIONS

Communication, dated Nov. 5, 2013, issued by the Japanese Patent Office, in counterpart Application No. 2009-142374.

*Primary Examiner* — Hoan C Nguyen
(74) *Attorney, Agent, or Firm* — Sughrue Mion, PLLC (57) ABSTRACT

Provided are diffuser, method of manufacturing same, and liquid crystal display device employing the diffuser. Liquid crystal display device includes: backlight unit; liquid crystal panel on which image is formed by using light emitted by backlight unit, and comprising: color filter comprising plurality of pixels each of which comprises plurality of subpixels that are alternately arranged and transmit light in different wavelength bands; and liquid crystal layer whose transmittance is adjusted under electrical control; and diffuser disposed on a top surface or a bottom surface of the liquid crystal panel and comprising diffusing areas and transparent areas which alternate with each other at intervals corresponding to the width of the subpixels, wherein the liquid crystal layer comprises liquid crystal areas corresponding to the diffusing areas and liquid crystal areas corresponding to the transparent areas and the transmittances of the liquid crystal areas are adjusted according to the subpixels.

11 Claims, 7 Drawing Sheets

(56) References Cited

U.S. PATENT DOCUMENTS

| | | | |
|---|---|---|---|
| 6,937,399 B2* | 8/2005 | Takahashi et al. | 359/599 |
| 7,006,173 B1* | 2/2006 | Hiyama et al. | 349/96 |
| 7,030,949 B2* | 4/2006 | Kashima | 349/115 |
| 2006/0038943 A1* | 2/2006 | Luo | 349/114 |
| 2007/0109481 A1* | 5/2007 | Mimura et al. | 349/143 |
| 2008/0303777 A1* | 12/2008 | Inoue et al. | 345/102 |
| 2009/0027591 A1* | 1/2009 | Hwang et al. | 349/64 |
| 2009/0034287 A1* | 2/2009 | Nagasawa et al. | 362/602 |
| 2010/0283947 A1* | 11/2010 | Nishihara et al. | 349/112 |

FOREIGN PATENT DOCUMENTS

| | | |
|---|---|---|
| JP | 2005-32537 A | 2/2005 |
| JP | 2007-69603 A | 3/2007 |
| JP | 2007-139904 A | 6/2007 |
| KR | 10-2008-0074535 A | 8/2008 |

* cited by examiner

STRIPED DIFFUSER, METHOD OF MANUFACTURING THE SAME, AND LIQUID CRYSTAL DISPLAY DEVICE WITH ADJUSTABLE VIEWING ANGLE EMPLOYING THE STRIPED DIFFUSER

CROSS-REFERENCE TO RELATED PATENT APPLICATION

This application claims the benefit of Korean Patent Application No. 10-2008-0056529, filed on Jun. 16, 2008, in the Korean Intellectual Property Office, the disclosure of which is incorporated herein in its entirety by reference.

BACKGROUND OF THE INVENTION

1. Field of the Invention

Methods and devices consistent with the present invention relate to displaying, and more particularly, to a diffuser and a display device with an adjustable viewing angle employing the diffuser.

2. Description of the Related Art

With the recent development of communication technology and display device technology, many portable terminals, such as a personal digital assistant (PDA), a portable multimedia player (PMP), and a digital multimedia broadcasting (DMB) system, have been developed.

Liquid crystal displays (LCDs), which are non-emissive flat panel display devices often used in portable terminals, form an image by changing the fraction of light transmitted through a liquid crystal cell according to an applied voltage. Since LCDs cannot emit light by themselves, a separate light source device, such as a backlight unit, is required.

Such LCDs have a problem in that a viewing angle is narrow due to a difference between an optical path in which light emitted from the backlight unit vertically passes through the liquid crystal cell and an optical path in which light emitted from the backlight unit obliquely passes through the liquid crystal cell. To solve the problem, various attempts have been made to increase a viewing angle.

Meantime, although a wide viewing angle is often preferred, a narrow viewing angle is preferred in applications for privacy protection and security measures.

Accordingly, there have been attempted to develop display devices which can provide a narrow viewing angle in a private mode where privacy protection is necessary and a wide viewing angle in a public mode where a plurality of people need to share images.

A display device, which is disclosed in Japanese Patent Publication No. 1997-197405, includes a polymer dispersed liquid crystal (PDLC) layer disposed on a top surface of a liquid crystal panel. The PDLC layer shifts between a diffusing state and a transparent state according to an applied voltage. In the diffusing state, incident light is diffused, thereby providing a wide viewing angle, and in the transparent state, collimated light is transmitted without being diffused, thereby providing a narrow viewing angle.

However, since the display device disclosed in Japanese Patent Publication No. 1997-197405 requires the PDLC layer in order to adjust a viewing angle, manufacturing costs are increased. Also, since the thickness of a liquid crystal cell should be increased in order to improve the contrast of the PDLC layer, a voltage used to drive the PDLC layer is increased, and an optical path in which light input through the liquid crystal panel is transmitted through the PDLC is lengthened, thereby increasing the risk of image blurring.

SUMMARY OF THE INVENTION

Exemplary embodiments of the present invention provide a diffuser, a method of manufacturing the same, and a display device with an adjustable viewing angle employing the diffuser.

According to an aspect of the present invention, there is provided a diffuser comprising diffusing areas and transparent areas which alternate with each other.

The diffusing areas may have a width greater than that of the transparent areas. A ratio of the width of the transparent areas to the pitch of the diffusing areas may range from 0.5 to 0.9.

The diffuser may further comprise: a substrate; and diffusion parts formed of a transparent resin containing a plurality of diffusing particles in the diffusing areas and arranged on the substrate to be spaced apart from one another, wherein spaces between the diffusion parts become the transparent areas.

According to another aspect of the present invention, there is provided a method of manufacturing a diffuser comprising diffusing areas and transparent areas which alternate with each other, the method comprising: forming a transparent resin layer, which contains a plurality of diffusing particles and is curable by ultraviolet rays, on a substrate; disposing a mask having stripe-shaped openings on the substrate and emitting ultraviolet rays to the transparent resin layer; and removing portions of the transparent resin layer to which the ultraviolet rays are not emitted and thus are not cured.

The width of the stripe-shaped openings may be determined so that the diffusing areas have a width greater than that of the transparent areas. The width of the stripe-shaped openings may be determined so that a ratio of the width of the diffusing areas to the pitch of the diffusing areas ranges from 0.5 to 0.9.

According to another aspect of the present invention, there is provided a liquid crystal display device comprising: a backlight unit; a liquid crystal panel on which an image is formed by using light emitted by the backlight unit, and comprising: a color filter comprising a plurality of pixels each of which comprises a plurality of subpixels that are alternately arranged and transmit light in different wavelength bands; and a liquid crystal layer whose transmittance is adjusted under an electrical control; and a diffuser disposed on a top surface or a bottom surface of the liquid crystal panel and comprising diffusing areas and transparent areas which alternate with each other at intervals corresponding to the width of the subpixels, wherein an area of the liquid crystal layer corresponding to each of the subpixels is divided into liquid crystal area corresponding to each of the diffusing areas and liquid crystal area corresponding to each of the transparent areas and the transmittances of the liquid crystal areas are adjusted separately.

In a public mode, an image with a wide viewing angle may be formed by using light passing through the liquid crystal areas of the liquid crystal layer corresponding to the diffusing areas, and, in a private mode, an image with a narrow viewing angle may be formed by not using light passing through the liquid crystal areas of the liquid crystal layer corresponding to the diffusing areas.

In the public mode, light passing through the liquid crystal areas of the liquid crystal layer corresponding to the transparent areas may not be used to form an image. In the public mode, both light passing through the liquid crystal areas of the liquid crystal layer corresponding to the transparent areas and light passing through the liquid crystal areas of the liquid crystal layer corresponding to the diffusing areas may be used to form an image.

The backlight unit may provide collimated light to the liquid crystal panel so that the full width at half maximum of luminance is in the range of ±20°.

BRIEF DESCRIPTION OF THE DRAWINGS

The above and other features and aspects of the present invention will become more apparent by describing in detail example embodiments thereof with reference to the attached drawings in which.

DETAILED DESCRIPTION OF THE INVENTION

Exemplary embodiments of the present invention will now be described more fully with reference to the accompanying drawings, in which exemplary embodiments of the invention are shown. In the drawings, like reference numerals denote like elements, and the sizes of components may be exaggerated for clarity.

Figure 1:
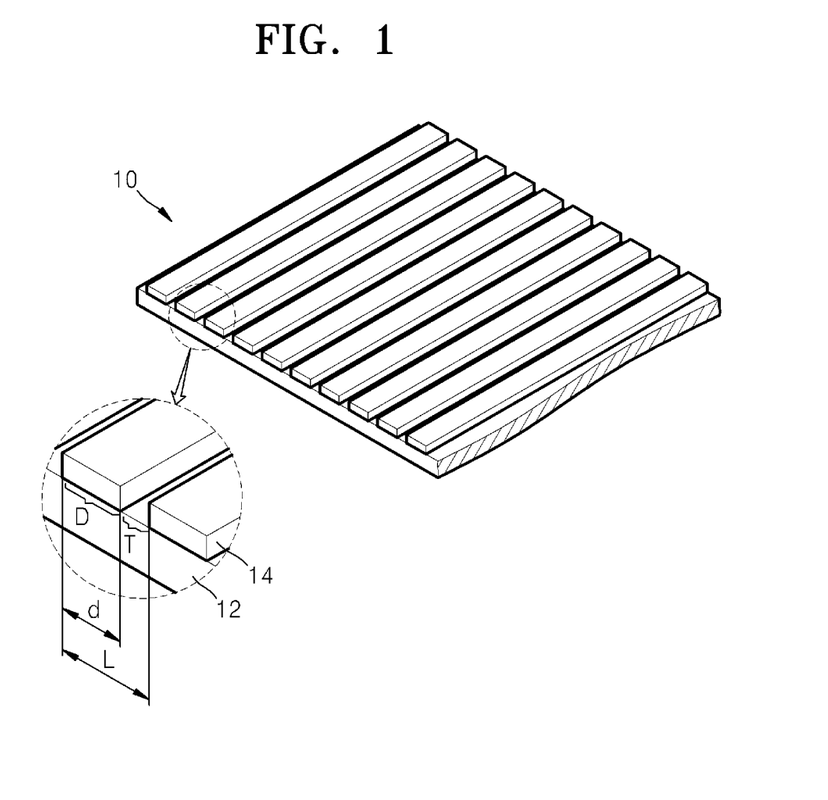
FIG. 1 is a perspective view of a diffuser according to an embodiment of the present invention.

FIG. 1 is a perspective view of a diffuser 10 according to an embodiment of the present invention. Referring to FIG. 1, the diffuser 10 includes diffusing areas D and transparent areas T which alternate with each other in one direction. The diffusing areas D and the transparent areas T which alternate with each other may form striped patterns. The diffusing areas D have a width equal to or greater than that of the transparent areas T. For example, a ratio of the width d of the diffusing areas D to the pitch L of the diffusing areas D may range from 0.5 to 0.9. When the width of the diffusing areas D is greater than that of the transparent areas T and the ratio of the width d of the diffusing areas D to the pitch L of the diffusing areas D ranges from 0.5 to 0.9, luminance when an image is formed by using light transmitted through the diffusing areas D and luminance when an image is formed by using light transmitted through the transparent areas T are kept similar to each other.

Diffusion parts 14 formed of a transparent resin containing a plurality of diffusing particles in the diffusing areas D are arranged on a substrate 12 to be spaced apart from one another, and spaces between the diffusion parts 14 become the transparent areas T. The substrate 12 may be formed of a transparent material. Alternatively, a polarizing plate employed by a display device may be used as the substrate 12. If the diffusion parts 14 are directly disposed on the polarizing plate, the thickness of the display device may be reduced, thereby reducing the risk of image blurring.

Figure 2A:
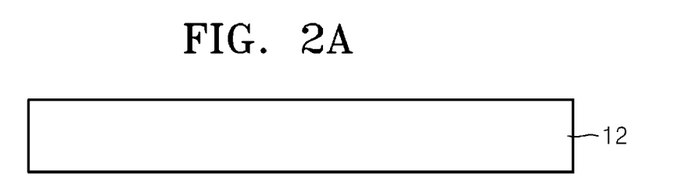
FIGS. 2A-2E illustrate cross-sectional views for explaining a method of manufacturing the diffuser of FIG. 1, according to an embodiment of the present invention.
Figure 2B:
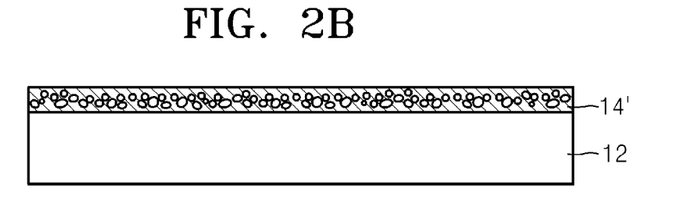
Figure 2C:
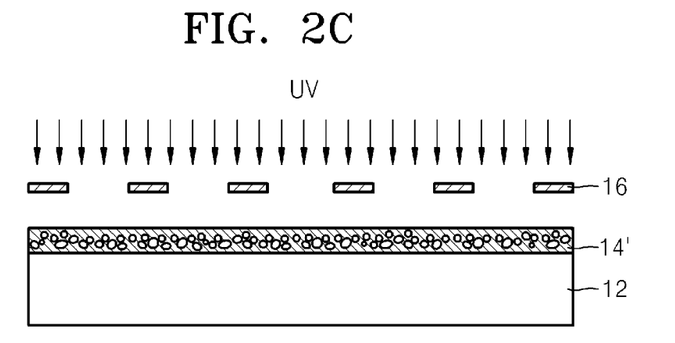
Figure 2D:
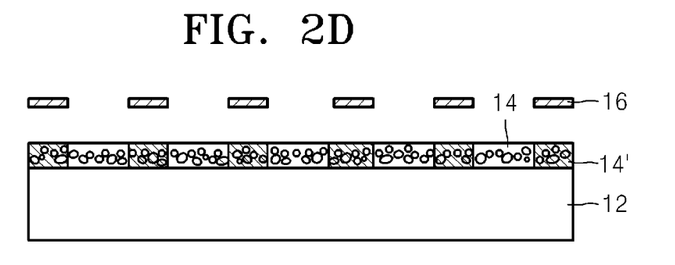
Figure 2E:
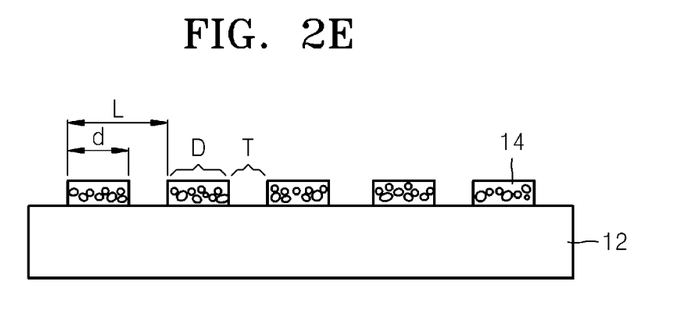

FIGS. 2A-E illustrate cross-sectional views for explaining a method of manufacturing the diffuser 10 of FIG. 1, according to an embodiment of the present invention. Referring to FIG. 2A, the substrate 12 is prepared. Referring to FIG. 2B, a transparent resin layer 14' is formed on the substrate 12. The substrate 12 may be a transparent substrate or a polarizing plate. The transparent resin layer 14' may be formed of a material containing a plurality of diffusing particles and curable by ultraviolet rays. Referring to FIG. 2C, a mask 16 is disposed on the transparent resin layer 14' and ultraviolet rays UV are emitted to the transparent resin layer 14'. Referring to FIG. 2D, a plurality of stripe-shaped openings are formed in the mask 16 in one direction. The width of the openings corresponds to the width d of the diffusing areas D as shown in FIG. 2E. The width of the openings may be determined so that the diffusing areas D have a width greater than that of the transparent areas T. For example, the width and the pitch of the openings may be determined so that the ratio of the width d of the diffusing areas D to the pitch L of the diffusing areas D ranges from 0.5 to 0.9. Only portions of the transparent resin layer 14' exposed to the ultraviolet rays UV emitted through the openings are cured to form the diffusion parts 14. Referring to FIG. 2E, portions of the transparent resin layer 14' not exposed to the ultraviolet rays UV due to the mask 16 are not cured and are removed, thereby completing the manufacture of the diffuser 10 including the diffusing areas D and the transparent areas T which alternate with each other.

In the above description, the diffusion parts 14 may be formed on a liquid crystal panel of a display device, not on the substrate 12. In this case, the diffusing areas D can be more easily aligned with subpixels.

Figure 3A:
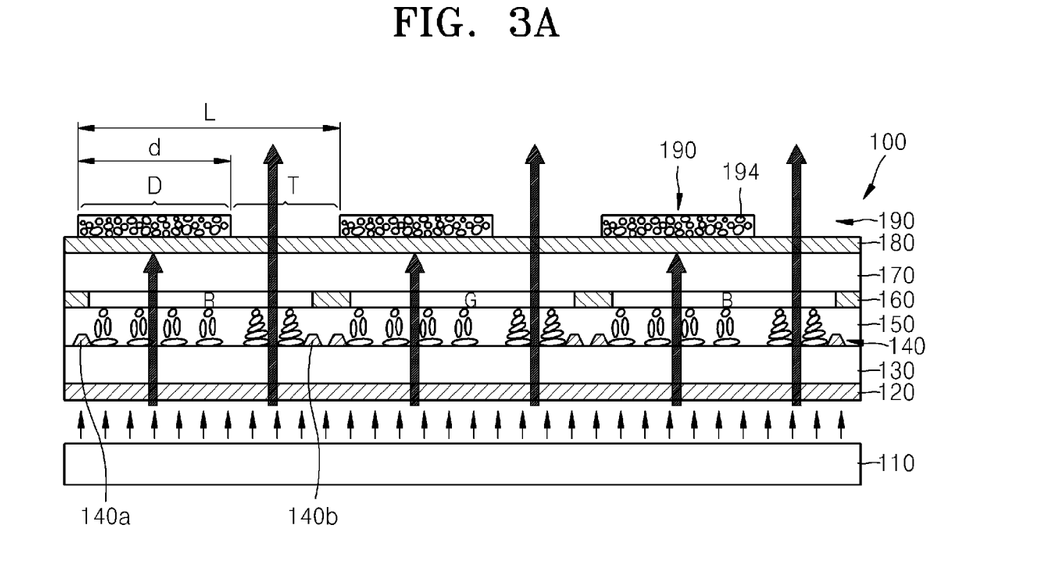
FIGS. 3A through 3C are cross-sectional views of a liquid crystal display device according to an embodiment of the present invention, in a private mode providing a narrow viewing angle, a first public mode providing a wide viewing angle, and a second public mode providing a wide viewing angle, respectively.
Figure 3B:
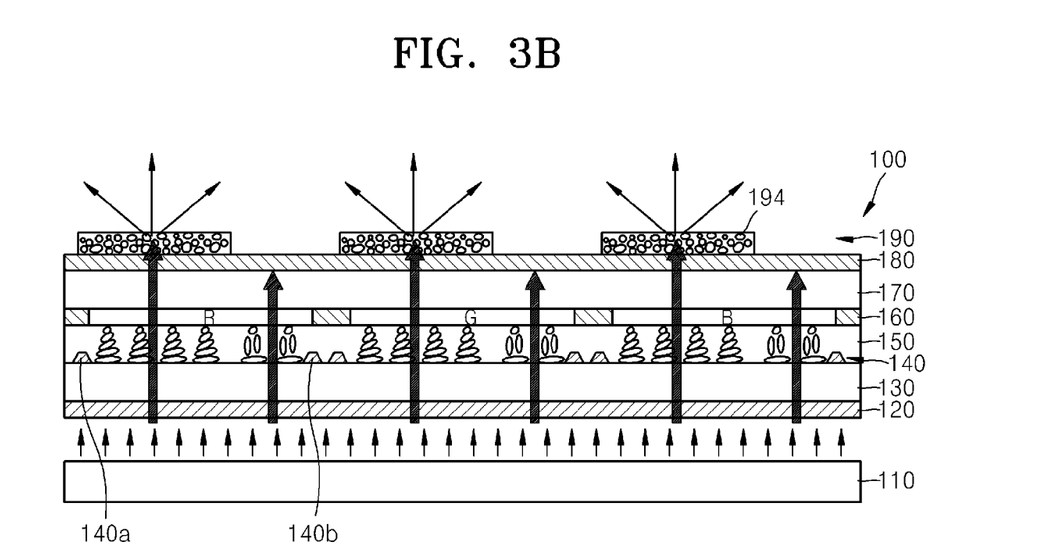
Figure 3C:
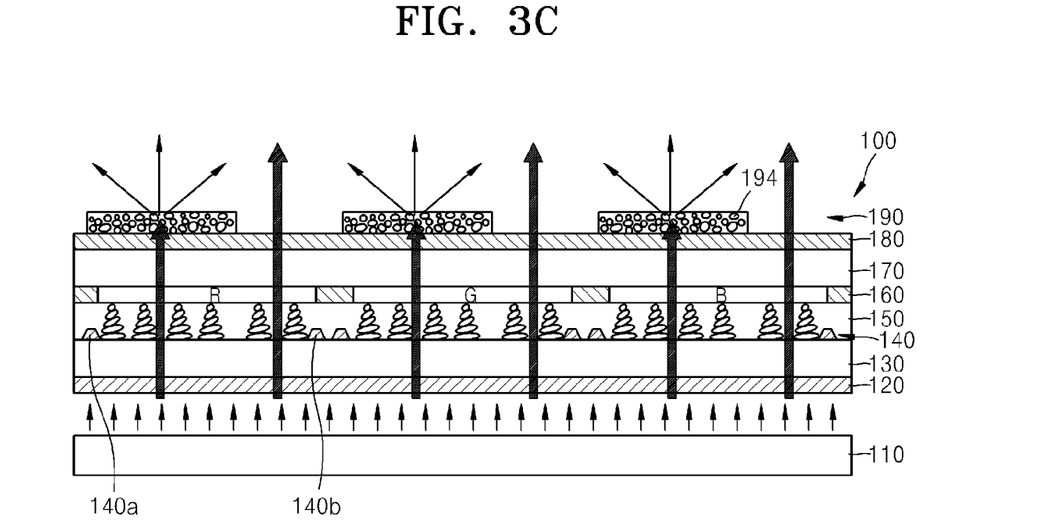

FIGS. 3A through 3C are cross-sectional views of a liquid crystal display device 100 according to an embodiment of the present invention, in a private mode providing a narrow viewing angle, a first public mode providing a wide viewing angle, and a second public mode providing a wide viewing angle, respectively.

Referring to FIGS. 3A through 3C, the liquid crystal display device 100 includes a backlight unit 110, a liquid crystal panel forming an image using light emitted from the backlight unit 110, and a diffuser 190 disposed on a top surface of the liquid crystal panel and including diffusing areas D and transparent areas T which alternate with each other.

The liquid crystal panel includes a color filter 160 including a plurality of pixels each of which includes a plurality of subpixels that are alternately arranged and transmit light in different wavelength bands, and a liquid crystal layer 150 whose transmittance is adjusted under an electrical control. Referring to FIGS. 3A through 3C, a red subpixel R, a green subpixel G, and a blue subpixel B constitute one pixel. The liquid crystal layer 150 is disposed between an upper transparent substrate 170 and a lower transparent substrate 130, and the color filter 160 is disposed between the upper transparent substrate 170 and the liquid crystal layer 150. A thin film transistor (TFT) layer 140 for electrically controlling the liquid crystal layer 150 is disposed between the lower transparent substrate 130 and the liquid crystal layer 150. An upper polarizing plate 180 and a lower polarizing plate 120 are respectively disposed on the upper transparent substrate 170 and the lower transparent substrate 130, and have polarization axes perpendicular to each other. If the upper transparent substrate 180 has a thickness less than about five times the width of the subpixels, the risk of image blurring may be reduced.

The diffusing areas D and the transparent areas T of the diffuser 190 which alternate with each other may form striped patterns. The combined pitch of each of the diffusing areas D and the transparent areas T of the diffuser 190 is at least substantially equal to the width of the subpixels. An area of the liquid crystal layer 150 corresponding to each of the subpixels is divided into liquid crystal area corresponding to each of the diffusing areas D and liquid crystal area corresponding to each of the transparent areas T and the transmittances of the liquid crystal areas are adjusted separately. For example, the TFT layer 140 includes TFTs 140a for electrically controlling the liquid crystal areas of the liquid crystal layer 150 corresponding to the diffusing areas D and TFTs 140b for electrically controlling the liquid crystal areas of the liquid crystal layer 150 corresponding to the transparent areas T. The diffusing areas D of the diffuser 190 have a width greater than that of the transparent areas T in order to ensure that luminance when an image is formed by using light passing through the diffusing areas D and luminance when an image is formed by using light passing through the transparent areas T are kept similar to each other. A ratio d/L of the width d of the diffusing areas D to the pitch L of the diffusing areas D may range from approximately 0.5 to 0.9.

The diffuser 190 may include diffusion parts 194 that are formed of a transparent resin containing a plurality of diffusing particles and are arranged to be spaced apart from one another. Although the diffusion parts 194 are arranged on the upper polarizing plate 180 in FIGS. 3A through 3C, the diffusion parts 194 of the diffuser 190 may be formed on a transparent substrate. However, when the diffusion parts 194 are directly disposed on the upper polarizing plate 180, the thickness of the liquid crystal display device 100 can be reduced, thereby reducing the risk of image blurring.

The backlight unit 110 provides light to the liquid crystal panel to form an image. In FIGS. 3A through 3C, the backlight unit 110 provides collimated light to the liquid crystal panel so that the full width at half maximum of luminance is in the range of ±20°. Examples of the backlight unit 110 will be explained later with reference to FIGS. 6 and 7.

The operation of the liquid crystal display device 100 in a private mode in which a narrow viewing angle is provided and a public mode in which a wide viewing angle is provided will now be explained. Although the operation of the liquid crystal display device 100 will be explained by using a normally white twisted nematic (TN) mode, the present invention is not limited thereto and other modes, such as an in plane switching (IPS) mode, a vertical alignment (VA) mode, and an electrically controlled birefringence (ECB) mode, may be used.

FIG. 3A illustrates the liquid crystal display device 100 in a private mode in which a narrow viewing angle is provided. In the private mode, light passing through the liquid crystal areas of the liquid crystal layer 150 corresponding to the diffusing areas D is not used to form an image, and only light passing through the liquid crystal areas of the liquid crystal layer 150 corresponding to the transparent areas T is used to form an image.

Collimated light provided by the backlight unit 110 passes through the lower polarizing plate 120 to be linearly polarized in one direction and then is incident on the liquid crystal layer 150. At this time, an electric field is applied under the control of the TFTs 140a to the liquid crystal areas of the liquid crystal layer 150 corresponding to the diffusing areas D, such that part of the light incident on the liquid crystal areas of the liquid crystal layer 150 corresponding to the diffusion areas D maintains its polarization state, and passes through the liquid crystal areas of the liquid crystal layer 150 corresponding to the diffusion areas D and is incident on the upper polarizing plate 180. The part of the light incident on the upper polarizing plate 180 is entirely absorbed by the upper polarizing plate 180 having the polarization axis perpendicular to that of the lower polarizing plate 120. Accordingly, light passing through the liquid crystal areas of the liquid crystal layer 150 corresponding to the diffusing areas D is not used to form an image. Meantime, light passing through the liquid crystal areas of the liquid crystal layer 150 corresponding to the transparent areas T is used to form an image. That is, the TFTs 140b turns on or off the liquid crystal areas of the liquid crystal layer 150 corresponding to the transparent areas T according to image information. In FIG. 3A, the liquid crystal areas of the liquid crystal layer 150 corresponding to the transparent areas T are assumed to be in an image-on state. That is, a voltage is not applied to the liquid crystal areas of the liquid crystal layer 150 corresponding to the transparent areas T, such that part of the light incident on the liquid crystal layer 150 is polarized in a direction perpendicular to the one direction, and passes through the liquid crystal layer 150 and passes through the upper polarizing plate 180 to form an image-on state. Accordingly, since an image is formed by using only light passing through the liquid crystal areas of the liquid crystal layer 150 corresponding to the transparent areas T and the light used to form the image maintains the degree of collimation that it has when incident on the liquid crystal panel, a narrow viewing angle can be provided in the private mode.

FIG. 3B illustrates the liquid crystal display device 100 in a first public mode in which a wide viewing angle is provided. In the first public mode, light passing through the liquid crystal areas of the liquid crystal layer 150 corresponding to the diffusing areas D is used to form an image, and light passing through the liquid crystal areas of the liquid crystal layer 150 corresponding to the transparent areas T is not used to form an image. That is, an electric field is applied under the control of the TFTs 140b so that light passing through the liquid crystal areas of the liquid crystal layer 150 corresponding to the transparent areas T is blocked. Also, the TFTs 140a controls light passing through the liquid crystal areas of the liquid crystal layer 150 corresponding to the diffusing areas D to be on or off, according to image information. Since light passing through the diffusing areas D is diffused by the diffusing particles, a wide viewing angle can be provided in the first public mode.

FIG. 3C illustrates the liquid crystal display device 100 in a second public mode in which a wide viewing angle is provided. In the second public mode, both light passing through the liquid crystal areas of the liquid crystal layer 150 corresponding to the diffusing areas D and light passing through the liquid crystal areas of the liquid crystal layer 150 corresponding to the transparent areas T are used to form an image. Both the liquid crystal areas of the liquid crystal layer 150 corresponding to the diffusing areas D and the transparent areas T are respectively controlled by the TFTs 140a and 140b to turn on or off light according to image information. Since a viewing angle of an image formed in this case is mainly determined by light passing through the diffusing areas D, the viewing angle provided in the second public mode of FIG. 3C is wider than that provided in the private mode of FIG. 3A. Also, since the amount of light used to form an image in the second public mode of FIG. 3C is greater than that in the public mode of FIG. 3B, higher luminance can be obtained.

Figure 4:
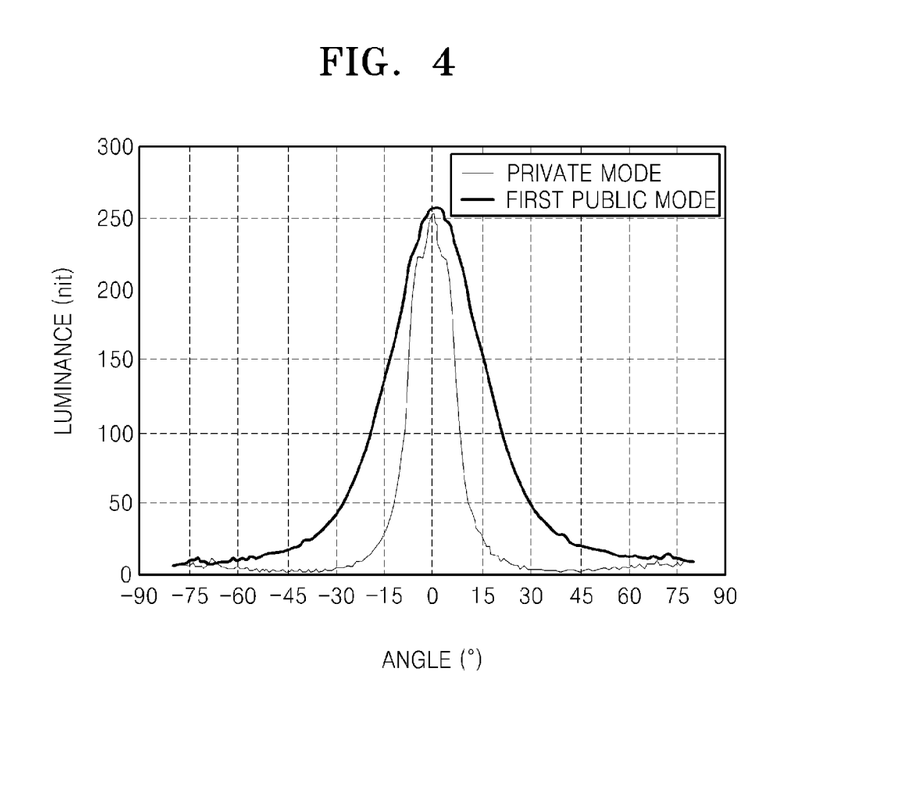
FIG. 4 is a graph illustrating a relationship between luminance and angle when the liquid crystal display device operates in the private mode of FIG. 3A and the first public mode of FIG. 3B.

FIG. 4 is a graph illustrating a relationship between luminance and angle when the liquid crystal display device 100 operates in the private mode of FIG. 3A and the first public mode of FIG. 3B. Referring to FIG. 4, a narrow viewing angle is provided in the private mode and a wide viewing angle is provided in the first public mode.

Figure 5:
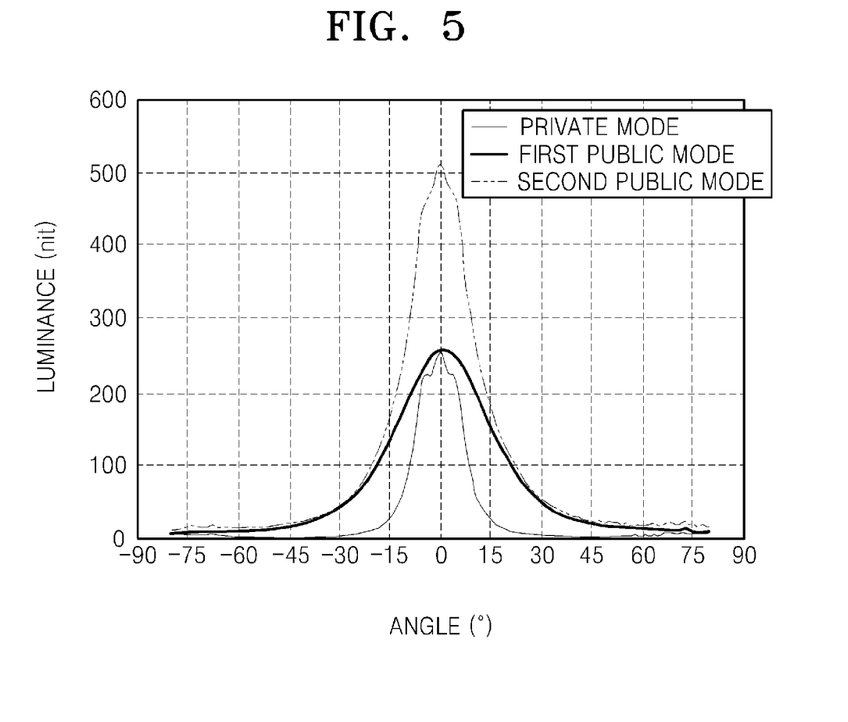
FIG. 5 is a graph illustrating a relationship between luminance and angle when the liquid crystal display device operates in the private mode of FIG. 3A, the first public mode of FIG. 3B, and the second public mode of FIG. 3C.

FIG. 5 is a graph illustrating a relationship between luminance and angle when the liquid crystal display device 100 operates in the private mode of FIG. 3A, the first public mode of FIG. 3B, and the second public mode of FIG. 3C. Referring to FIG. 5, a viewing angle provided in each of the first and second public modes is wider than that provided in the private mode. However, the highest luminance can be obtained in the second public mode of FIG. 3C.

Figure 6:
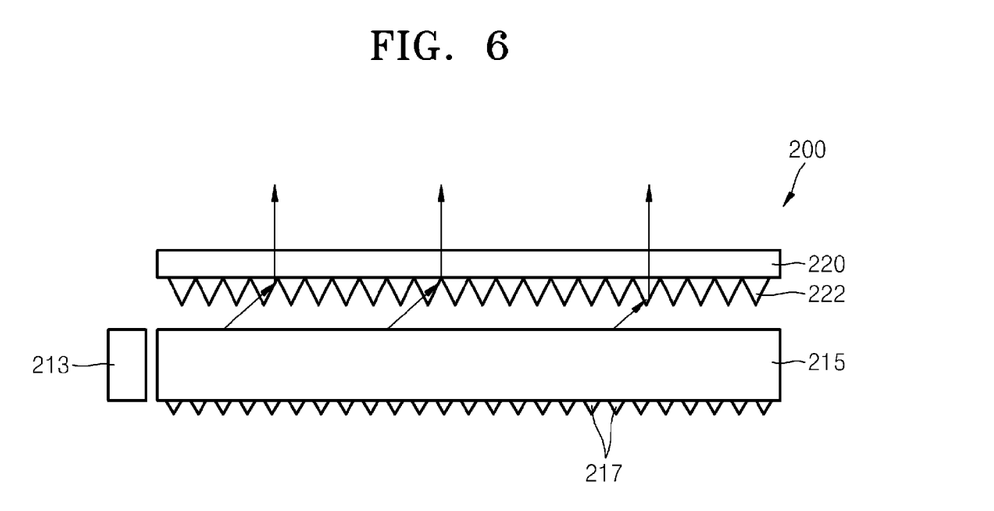
FIGS. 6 and 7 are cross-sectional views illustrating examples of a backlight unit employed by the liquid crystal display device of FIGS. 3A through 3C.
Figure 7:
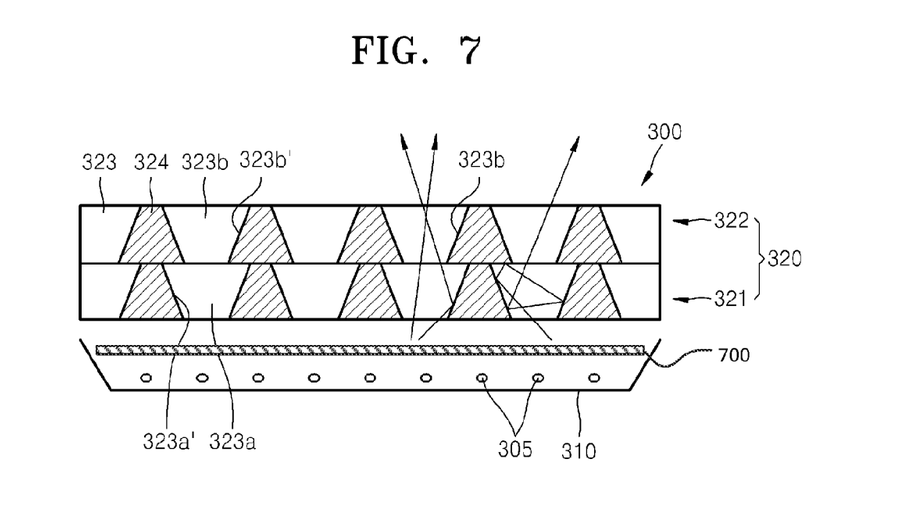

FIGS. 6 and 7 are cross-sectional views illustrating examples of the backlight unit 110 employed by the liquid crystal display device 100 of FIGS. 3A through 3C.

FIG. 6 is a cross-sectional view of a backlight unit 200 for providing collimated light, which is disclosed in Korean Patent Application No. 10-2007-75910 filed by the present applicant. The backlight unit 200 is of an edge light type, and includes a light source 213, a light guide plate 215 guiding light emitted by the light source 213 to the liquid crystal panel, and a reverse prism sheet 220 disposed above the light guide plate 215. The light source 213 may be a point light source, such as a light emitting diode (LED), or a line light source, such as a cold cathode fluorescent lamp (CCFL). The light guide plate 215 may have a prism 217 formed on at least one of a top surface and a bottom surface thereof in order to emit light at a high elevation angle and improve light use efficiency. Although the prism 217 is formed on the bottom surface of the light guide plate 215 in FIG. 6, the present invention is not limited thereto, and prisms may be formed on the top surface and the bottom surface of the liquid guide plate 215 in directions orthogonal to each other.

The reverse prism sheet 220 on a bottom surface of which a prism 222 is formed is disposed above the light guide plate 215. The reverse prism sheet 220 helps light emitted from the light guide plate 215 to travel in a direction almost perpendicular to the top surface of the light guide plate 215.

FIG. 7 is a cross-sectional view of a backlight unit 300 for providing collimated light, which is disclosed in Korean Patent Application No. 10-2007-0013812 filed by the present applicant. The backlight unit 300 is of a direct light type, and includes light sources 305 disposed in a reflector 310 having a reflective surface, and a collimator 320 collimating light emitted by the light sources 305. The collimator 320 includes a first plate-shaped member 321 and a second plate-shaped member 322 which are adhered to each other. The collimator 320 includes a plurality of light transmitting areas 323 and non-transmitting areas 324 formed between the light transmitting areas 323. The light transmitting areas 323 includes first light transmitting areas 323a of the first plate-shaped member 321 and second light transmitting areas 323b of the second plate-shaped member 322. Inner surfaces of the first light transmitting areas 323a and the second light transmitting areas 323b are reflective surfaces 323a' and 323b'. The non-transmitting areas 324 may have an additional mirror or a mirror structure in order to reflect incident light to the light sources 305 or the reflector 310. In the backlight unit 300 constructed as described above, light emitted from the collimator 320 has a narrower angle than that of light incident on the collimator 320.

A diffusion plate 700 for uniformly diffusing light may be further disposed between the light sources 305 and the collimator 320.

The backlight units 200 and 300 illustrated in FIGS. 6 and 7 are illustrative examples, and thus any backlight units that can provide collimated light to the liquid crystal panel can be employed by the liquid crystal display device according to the present invention.

Figure 8A:
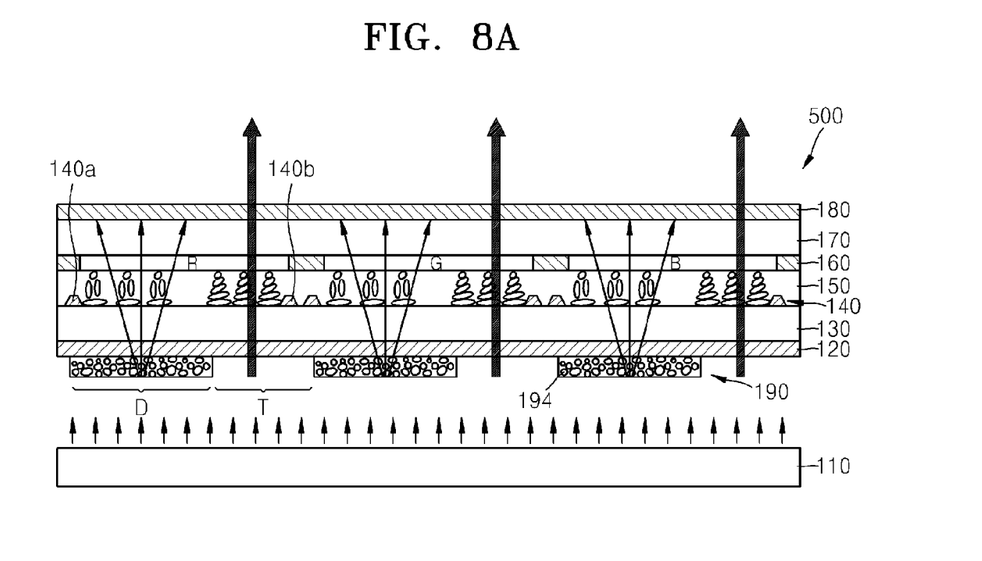
FIGS. 8A and 8B are cross-sectional views of a liquid crystal display device according to another embodiment of the present invention, in a private mode and a public mode, respectively.
Figure 8B:
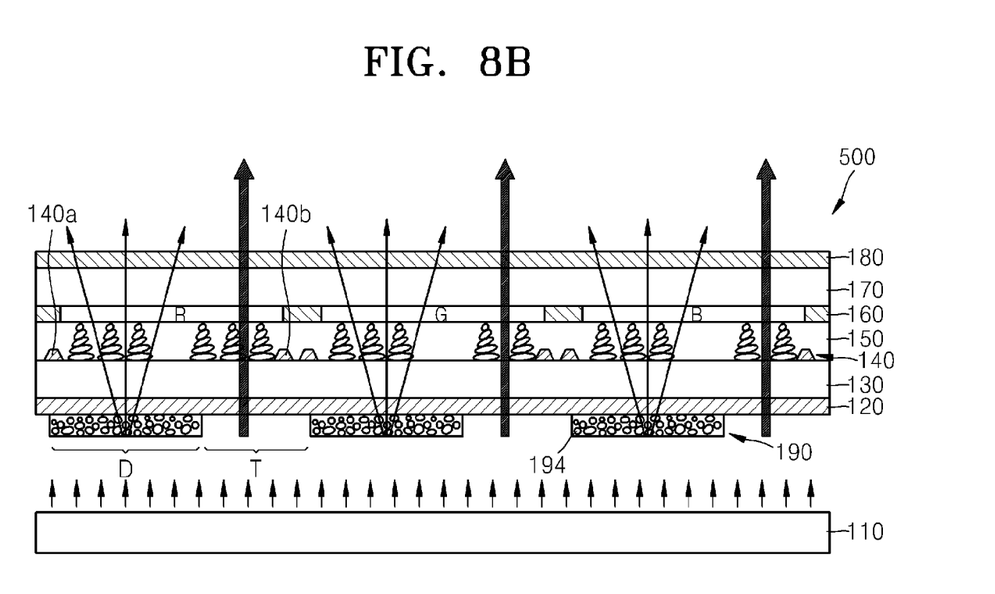

FIGS. 8A and 8B are cross-sectional views of a liquid crystal display device 500 according to another embodiment of the present invention, in a private mode and a public mode, respectively.

The liquid crystal display device 500 of FIGS. 8A and 8B is substantially the same as the liquid crystal display device 100 of FIGS. 3A through 3C except for the position of the diffuser 190. In detail, the diffuser 190 of the liquid crystal display device 500 of FIGS. 8A and 8B is disposed between the backlight unit 110 and the liquid crystal panel, whereas the diffuser 190 of the liquid crystal display device 100 of FIGS. 3A through 3C is disposed on the top surface of the liquid crystal panel. Referring to FIG. 8A, in the private mode, an image with a narrow viewing angle is formed by using only light passing through the transparent areas T. Referring to FIG. 8B, in the public mode, an image with a wide viewing angle is formed by using both light passing through the diffusing areas D and light passing through the transparent areas T. Alternatively, in the public mode, an image with a wide viewing angle may be formed by using only light passing through the diffusing areas D unlike in FIG. 8B.

As described above, since the liquid crystal display device according to the present invention can effectively adjust a viewing angle by using the backlight unit providing collimated light and the diffuser, an image with a narrow viewing angle can be displayed in a private mode and an image with a wide viewing angle can be displayed in a public mode.

While the diffuser, the method of manufacturing the same, and the liquid crystal display device with an adjustable viewing angle employing the diffuser according to the present invention have been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A liquid crystal display device comprising:
 a backlight unit; and
 a liquid crystal panel which forms an image using light emitted by the backlight unit, and comprising:
  a color filter comprising a plurality of pixels each of which comprises a plurality of subpixels that transmit light in different wavelength bands;
  a liquid crystal layer whose transmittance is adjusted under an electrical control;
  a first polarizing plate and a second polarizing plate which are spaced apart from each other and the liquid crystal layer is disposed therebetween;
  a diffuser disposed directly on the first polarizing plate or the second polarizing plate, the diffuser comprising diffusing areas and transparent areas which alternate with each other at intervals corresponding to the width of each of the subpixels; and
  a thin film transistor layer which controls a transmittance of the liquid crystal layer;
 wherein an area of the liquid crystal layer corresponding to each of the subpixels is divided into a first liquid crystal area facing one of the diffusing areas and a second liquid crystal area facing one of the transparent areas and transmittances of the first and second liquid crystal areas are adjusted separately, and wherein the thin film transistor layer includes a first transistor for controlling a transmittance of the first liquid crystal area and a second transistor for controlling a transmittance of the second liquid crystal area.

2. The liquid crystal display device of claim 1, wherein, in a public mode, an image with a wide viewing angle is formed by using light passing through the first liquid crystal area of the liquid crystal layer, and, in a private mode, an image with a narrow viewing angle is formed by not using light passing through the first liquid crystal area of the liquid crystal layer.

3. The liquid crystal display device of claim 2, wherein, in the public mode, light passing through the second liquid crystal area of the liquid crystal layer is not used to form the image with the wide viewing angle.

4. The liquid crystal display device of claim 2, wherein, in the public mode, both the light passing through the first liquid crystal area of the liquid crystal layer and the light passing through the second liquid crystal area of the liquid crystal layer are used to form an image.

5. The liquid crystal display device of claim 1, wherein the diffuser comprises diffusion parts formed of a transparent resin including a plurality of diffusing particles and arranged to be spaced apart from one another.

6. The liquid crystal display device of claim 1, wherein the liquid crystal layer is disposed between an upper transparent substrate and a lower transparent substrate, wherein, the diffuser is formed on the top surface of the liquid crystal panel and the upper transparent substrate includes a thickness less than five times the width of each of the subpixels.

7. The liquid crystal display device of claim 1, wherein the backlight unit provides collimated light to the liquid crystal panel so that the full width at half maximum of luminance is in a range of ±20°.

8. The liquid crystal display device of claim 7, wherein the backlight unit comprises:
a light source;
a light guide plate which guides light emitted by the light source to the liquid crystal panel and comprises a prism formed on at least one of a top surface of the light guide plate and a bottom surface of the light guide plate; and
a reverse prism sheet disposed above the light guide plate.

9. The liquid crystal display device of claim 8, wherein prisms are arranged on the top surface and the bottom surface of the liquid guide plate in directions orthogonal to each other.

10. The liquid crystal display device of claim 7, wherein the backlight unit comprises:
a light source disposed in a reflector and comprising a reflective surface; and
a collimator comprising a plate-shaped member having a plurality of light transmitting areas through which light passes and a plurality of non-transmitting areas formed between the light transmitting areas,
wherein each of the light transmitting areas comprises at least one reflective surface inclined with respect to a plane direction of the plate-shaped member and a direction perpendicular to the plane direction.

11. The liquid crystal display device of claim 10, further comprising a diffusion plate disposed between the light source and the collimator.

* * * * *